Aug. 1, 1961 J. S. CROWE 2,994,454
DECORATED CAN BODY
Filed April 11, 1957

INVENTOR.
JOSEPH S. CROWE
BY Charles H. Erne
Leland R. M<sup>c</sup>Cann
George W. Reiber
ATTORNEYS

United States Patent Office 2,994,454
Patented Aug. 1, 1961

2,994,454
DECORATED CAN BODY
Joseph S. Crowe, Wood Ridge, N.J., assignor to American Can Company, New York, N.Y., a corporation of New Jersey
Filed Apr. 11, 1957, Ser. No. 652,293
2 Claims. (Cl. 220—64)

The present invention pertains to a sheet metal can body having a fully decorated exterior and the method of producing same. More particularly, the invention pertains to a fully decorated sheet metal can body having a soldered or welded side seam, and the method of producing the decorated can body.

By the term "metallically bonded" as used hereinafter is meant a bond formed by welding or soldering as opposed to a bond formed with an organic cement or adhesive.

In the can making art, by far the most usual means of forming the can body is to bring a flat, sheet metal blank into tubular or cylindrical configuration with the marginal edges of the blank in engagement and thereafter securely to bond and seal these edges together by means of solder. Although not as prevalent as soldering, welding is sometimes used to bond the engaged marginal edges. However, this type of operation, whether soldering or welding is involved, gives rise to a problem of decorating the exterior of the can body.

Except for can bodies which are overwrapped with a paper label, as with food cans, cans having a metallically bonded side seam and having outside decoration most usually have that decoration applied to the flat blank prior to its being formed into a body. However, the marginal edges of the flat blank must be left as uncoated or undecorated bare metal so that the solder will adhere to, or welding current will pass through the margins during the bonding operation. Therefore, in the finished can body, there is an area extending the length of the body along and including the side seam which is undecorated bare metal. A can body having such a bare metal area suffers in appearance and in customer appeal by comparison with a can body having a fully decorated exterior such as the seamless can body used in many shaving cream cans.

It is therefore, an object of the present invention to provide a can body having a metallically bonded side seam and having a fully decorated exterior.

Another object is to provide a sheet metal can body having a metallically bonded side seam and having an outside appearance comparable to a fully decorated, seamless can body.

A further object is to provide a method of forming a sheet metal can body of the character described.

Numerous other objects and advantages of the invention will be apparent as it is better understood from the following description, which, taken in connection with the accompanying drawings, discloses a preferred embodiment thereof.

Referring to the drawings.

Figure 1:
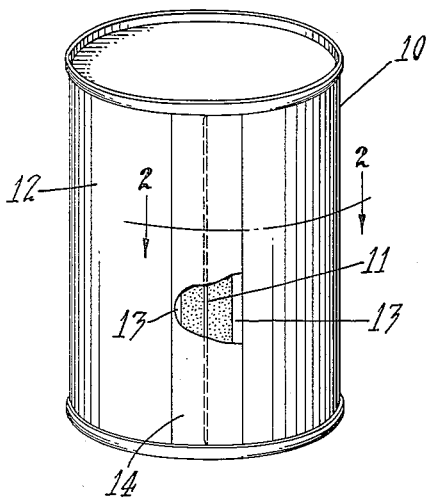
FIGURE 1 is a perspective view of a can body decorated according to the present invention.

As a preferred or exemplary embodiment of the instant invention, FIG. 1 shows a can body 10 having a solder bonded, conventional lock and lap side seam 11. If desired, the side seam 11 could be welded in which case the marginal edges forming the seam would be overlapped or butted. A decorative coating 12, such as lithography, which has been applied to the flat blank from which can body 10 is formed, covers the entire exterior surface of can body 10 except for a bare metal area 13 extending the length of the can body and including side seam 11. Completely covering and securely adhered to this bare metal area 13 is a decorated, synthetic resin strip 14.

The strip 14 may be of any suitable resinous or plastic material which is capable of being formed into a solvent and chemical resistant, self-supporting film and is also capable of being securely bonded to the bare metal area 13 by means of heat. The plastic material from which strip 14 is formed may inherently possess the necessary heat sealability or this property may be imparted to the strip 14 by the coating thereof with a heat sealing adhesive. Heat sealable plastics or resins which may be formed into self-supporting films and include such materials as Mylar, a terephthalic acid-ethylene glycol polyester; Vinylite VYHH, a vinyl chloride-vinyl acetate copolymer; cellulose esters, such as cellulose acetate; and Pliofilm, a rubber hydrochloride. If a heat sealable adhesive is used in conjunction with the strip 14, care must be taken that the adhesive is compatible with or adheres to both the bare metal area 13 and the surface of the strip 14. Such adhesives are known to the art and include Vinylseal, a vinyl acetate-vinyl alcohol copolymer; Saran F–120, a vinylidene chloride-acrylonitrile copolymer; Geon 222, a vinylidene chloride-vinyl chloride copolymer; and Norelacs, polyamide resins from fatty acids and polyamines. Of the above two alternatives, uncoated strips or adhesively coated strip, the uncoated, inherently heat sealable strip 14 is preferred.

In order to be self-supporting, strip 14 must be at least about 0.5 mil thick. The preferred maximum thickness of strip 14 is about 5.0 mils. Strips thicker than 5.0 mils may be used, but no advantage is gained to offset the increased cost thereof.

Strip 14 may be decorated in any desired manner commensurate with the properties of the resin from which the strip is formed. The strip may be formed from a suitably colored resin, thereby giving it color throughout its entirety. Or the strip may be decorated with a desired color, design or legend only on the surface which will be exposed, by the application of suitable inks or dyes.

Figure 2:
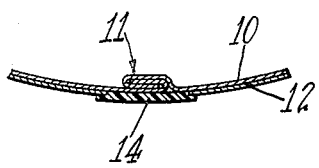
FIG. 2 is a sectional view taken substantially along lines 2—2 of FIG. 1.
Figure 3:
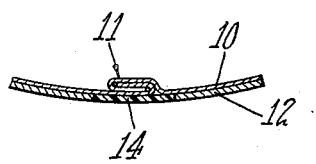
FIG. 3 is a sectional view similar to FIG. 2 but showing a modification thereof.

As shown in FIGS. 2 and 3, strip 14 may be applied over the bare metal area 13 either with the marginal edges of the strip overlapping the decorated portion 12 of the can body (FIG. 2); or with the decorated strip 14 inserted between the terminal edges of the decoration 12 in such a manner that there is, in effect, a butt joint between the side edges of strip 14 and the decoration 12 (FIG. 3).

Figure 4:
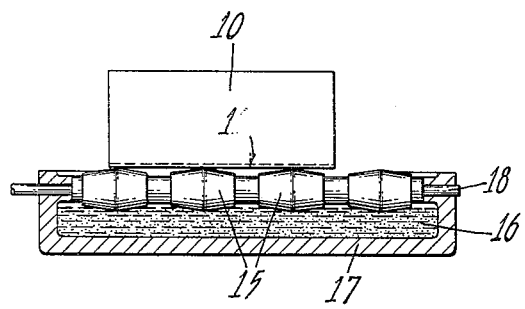
FIG. 4 is a side elevational view partly in section, showing metallically bonding the can body side seam by means of soldering.
Figure 6:
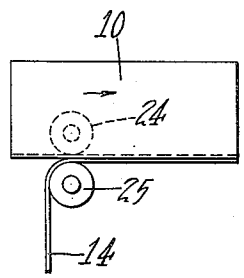
FIG. 6 is a side elevational view showing the combined steps of applying and pressing a resin strip onto the side seam of the can body.
Figure 5:
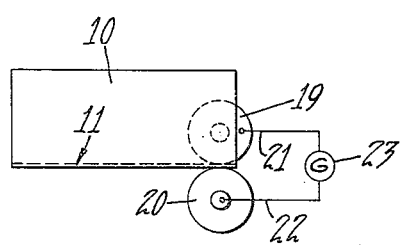
FIG. 5 is a view similar to FIG. 4 but showing metallically bonding the side seam by means of welding.

Referring to the method illustrated in FIGS. 4 to 6 inclusive, the side seam 11 of the can body 10 is formed in a conventional manner such as soldering a lock and lap side seam (FIG. 4) or welding lapped or butted marginal edges (FIG. 5). In the soldering operation shown in FIG. 4, the interlock marginal edges forming the side seam are passed over a series of solder rolls 15 rotating in a bath of molten solder 16 contained in a suitable pot or reservoir 17. The solder rolls 15 are rotated on a shaft 18 journaled in the sides of the pot 17 and driven by any suitable means (not shown).

FIG. 5 schematically illustrates a means of forming a welded side seam. The apparatus schematically illustrated in FIG. 5 comprises a pair of opposed rotatable resistance welding electrodes 19, 20 between which the side seam 11 is passed. Welding current is fed to the electrodes 19, 20 through current carrying leads 21, 22 to which welding current is supplied in a well-known manner, for example, generator 23.

After the side seam 11 of the can body 10 has been metallically bonded either by soldering or welding, and while the bare metal area 13 is still hot from the bonding operation, the decorated strip 14 is applied and adhered to the hot metal area 13. As schematically illustrated in FIG. 6, this application of strip 14 may be accomplished by passing the hot metal area 13, immediately after the metallic bonding of the side seam 11, between a pair of opposed rotatable pressure rollers 24, 25 with the strip 14 being fed to the periphery of the outside roller 25 whereby the strip 14 is fed into the bite between roller 25 and the bare metal area 13. In this manner, the strip 14 is firmly pressed against the heated metal in metal area 13 and, by virtue of its heat sealable nature or of the heat sealability of an adhesive carried thereon, the strip 14 becomes firmly adhered to and covers the bare metal area 13.

It is preferred to impart the heat to the bare metal area 13 necessary to firmly bond strip 14 to area 13 by means of the metallic bonding operation since this means requires no additional heating operations or equipment and is therefore the simplest means. However, although less satisfactory, other means, such as open flames, e.g. Selas or ribbon burners, may be used to impart the necessary heat to area 13 using operations and equipment separate and remote from the metallic bonding operation.

Decorated tape 14 may be fed to pressure roller 25 either from a spool (not shown) or as precut lengths corresponding to the length of the side seam to be covered. The feeding of tape 14 to the pressure roller 25 may be accomplished in any suitable manner (not shown).

It is though that the invention and many of its attendant advantages will be understood from the foregoing description, and it will be apparent that various changes may be made in the form, construction and arrangement of the parts and that changes may be made in the steps of the method described and their order of accomplishment without departing from the spirit and scope of the invention or sacrificing all of its material advantages, the forms hereinbefore described being merely preferred embodiments thereof.

I claim:
1. In combination, a high strength, sheet metal can body having a metallically bonded side seam and a decorative coating of predetermined thickness which extends over substantially the entire outer surface of the body with the exception of a narrow zone within which the side seam is included, and a preformed, self-supporting, decorative strip composed of colored synthetic resin having a thickness at least as great as said predetermined thickness of coating, and a width equal to at least the entire width of said uncoated zone, said strip covering the length of said zone and being securely heat sealed in place throughout its entire area, whereby said can body is caused to be completely covered on its outer surface by a continuous decorative covering.

2. In combination, a high strength sheet metal can body having a metallically bonded side seam and a decorative coating of predetermined thickness which extends over substantially the entire outer surface of the body with the exception of a narrow zone within which the side seam is included, and a preformed, heat sensitive, self-supporting, decorative strip composed of colored synthetic resin having a thickness substantially the same as the thickness of said coating and a width equal to the width of said uncoated zone, said strip covering the length of said zone and being securely heat sealed in place throughout its entire area whereby the lateral edges of said coating and strip abut and merge to present a continously decorated outer surface.

References Cited in the file of this patent

UNITED STATES PATENTS

| | | |
|---|---|---|
| 2,346,714 | Wobbe | Apr. 18, 1944 |
| 2,795,263 | Honkanen | June 11, 1957 |
| 2,795,264 | Pechy | June 11, 1957 |
| 2,797,023 | Kaercher et al. | June 25, 1957 |
| 2,797,843 | Orlins | July 2, 1957 |

FOREIGN PATENTS

| | | |
|---|---|---|
| 870,731 | France | Dec. 22, 1941 |